UNITED STATES PATENT OFFICE.

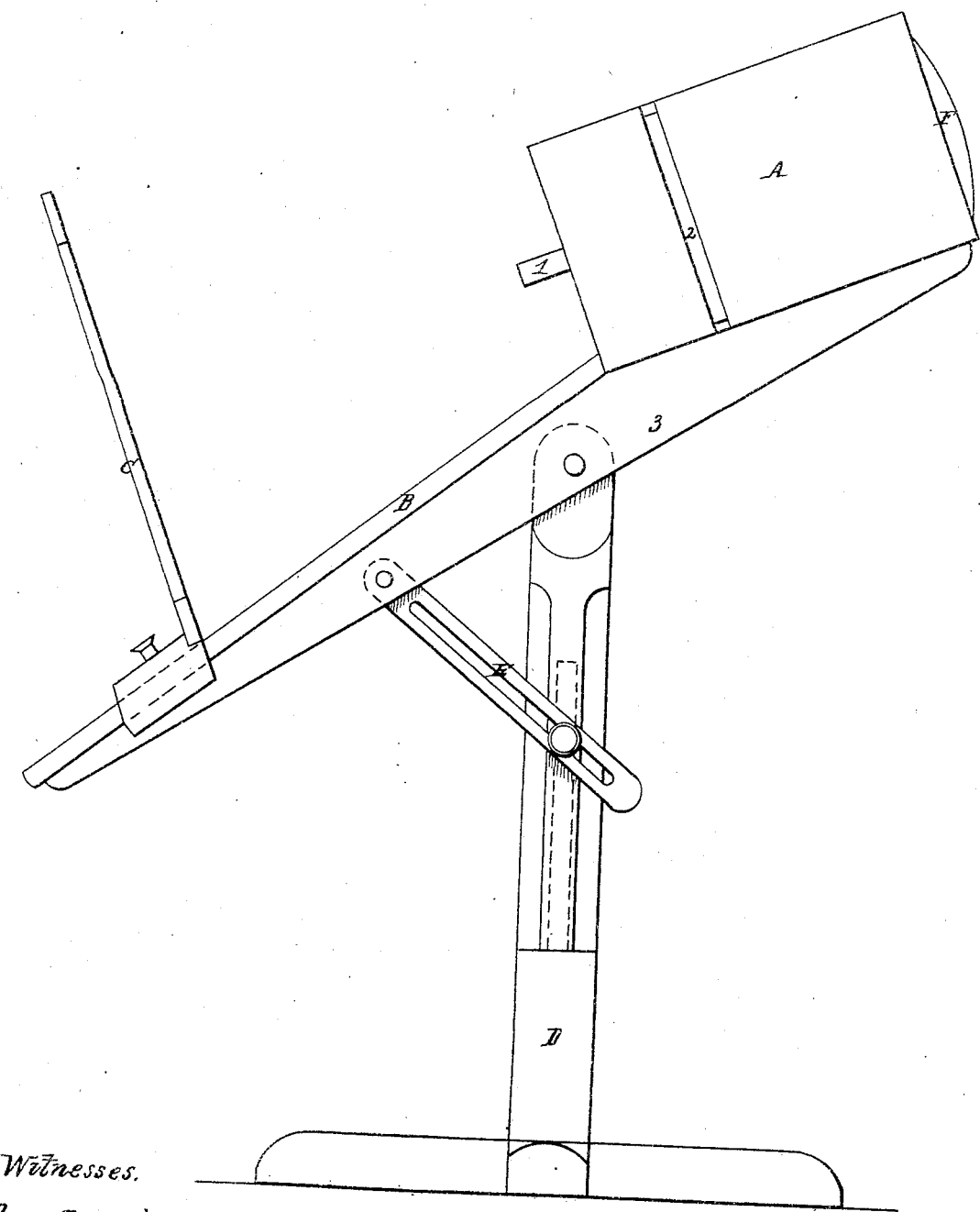

DAVID SHIVE, OF PHILADELPHIA, PENNSYLVANIA.

ENLARGING PHOTOGRAPHS.

Specification forming part of Letters Patent No. 23,316, dated March 22, 1859; Reissued March 13, 1866, No. 2,198.

*To all whom it may concern:*

Be it known that I, DAVID SHIVE, of the city of Philadelphia, in the State of Pennsylvania, have invented a new and useful Improvement in Photograph Instruments; and I do hereby declare that the following is a full, clear, and exact description of the construction and operation of the same, reference being had to the accompanying drawing and to the letters of reference marked thereon.

The nature of my invention consists in the arrangement of an illuminating lens in the, usually, open end of a photographic camera (or that end of the box which is directly opposite the usual tubular end containing the magnifying lens or lenses); the said camera being secured upon a rigid board or plane fitted with an adjustably sliding support for holding the photographic paper at right angles to the focal line of the said lenses and at any suitable distance therefrom, the whole being supported together upon a stand so as to admit of being swiveled in such a manner as to enable me to readily adjust the same, at pleasure, so that the focal line of the lenses may be kept in direct line with the same, whereby I am enabled to dispense with the reflector heretofore required for illuminating the usual translucent negative picture and producing the photogenic effect upon the paper; and also to readily and continuously converge the direct rays of the sun upon the said picture in such a manner as to more than double the degree of illumination usually afforded by a reflector, and consequently, to proportionally shorten the time heretofore required to produce an enlarged photograph, or the photogenic result upon the paper, and therefore to effect a much more perfect result.

Referring to the drawing, A represents a box, fitted with a tube, 1, containing the usual lens, and also with a slot, 2, through which the translucent negative picture is to be inserted. This box (A) is fixed upon a board stiffened by ribs 3, (as seen in the drawing) and upon which is adapted to slide toward and from the box (A), the paper holder, C, in such a manner as to constantly preserve a parallelism between the paper which it is designed to support and the tube end of the said box (A). The whole is supported upon a stand, D, so as to be readily adjusted vertically, and also so as to be swiveled thereon horizontally, as occasion may require in keeping it longitudinally in direct line with the sun, and thus dispensing with the mirror heretofore used for the purpose of reflecting the sun's rays into the box for illuminating the negative picture. It is also fitted with an adjustable stay-brace, E, for the purpose of adjusting and holding the instrument at such inclinations as the positions of the sun may, from time to time, require.

The illuminating lens is represented at F. and consists of a convex, or plano-convex lens, as large in its diameter as can be adapted to the size of the swiveling instrument before described, which is fixed across at the sun-end thereof, as seen in the drawing, so as to converge the direct rays of the sun upon the translucent picture (placed in the box (A) through the slot, 2,) from which the required photograph is to be produced upon the paper which may have been fixed upon the holder (C). By thus applying such a lens I am enabled to illuminate the translucent negative picture so effectually as to produce life-size photographic portraits in a much shorter time than heretofore and in the most perfect and beautiful manner, from the usual small negative pictures.

Having thus fully described the usual photograph instrument, and also my improvement upon the same, I do not claim, broadly, the use of an illuminating lens in connection with a camera, but;

What I claim as new and desire to secure by Letters Patent is—

The arrangement of the illuminating lens (F) in the, usually, open end of a photographic camera supported, in connection with the adjustable paper-holder (C), upon a stand (D), substantially as described, so as to operate in the manner and for the purposes specified.

DAVID SHIVE.

Witnesses:
  BENJ. MORISON,
  JNO. B. KENNEY.

[FIRST PRINTED 1911.]